United States Patent Office 3,702,312
Patented Nov. 7, 1972

3,702,312
FLUORIDE-CONTAINING CRYSTALLINE ALUMINO-SILICATES
William B. Wilson, Pleasant Hill, Calif., assignor to Shell Oil Company, New York, N.Y.
No Drawing. Continuation-in-part of application Ser. No. 714,328, Mar. 19, 1968. This application Oct. 5, 1970, Ser. No. 78,248
Int. Cl. B01j *11/78, 11/40*
U.S. Cl. 252—442
11 Claims

ABSTRACT OF THE DISCLOSURE

A novel crystalline alumino-silicate containing fluorine incorporated into the crystalline structure is prepared by treating a divalent alkaline earth metal form of the alumino-silicate sequentially with a sequestering agent followed by treatment with a solution of aluminum, fluoride and chloride ions. The fluoride-containing alumino-silicates are highly active and stable hydroconversion catalysts when composited with a hydrogenative metal component.

CROSS REFERENCE TO RELATED APPLICATION

This application is a continuation-in-part of copending application Ser. No. 714,328, filed Mar. 19, 1968 and now abandoned.

BACKGROUND OF THE INVENTION

Field of the invention

This invention relates to a hydrocarbon conversion catalyst. More particularly, the invention relates to a crystalline alumino-silicate catalyst having fluoride incorporated into the crystal structure and a process of preparing and using the catalyst.

Description of the prior art

Heterogeneous catalysts of various types are of major importance in the conversion of hydrocarbons. Catalytic functions are usually broadly described as hydrogenative and acidic. Acidic catalytic properties are especially important in cracking reactions and hydrogenation functions are important for hydrogenation catalysts. In many commercially significant catalysts, however, both acidic (cracking) and hydrogenative functions are desired in combination. The concept of dual functional catalyst is well known in the art and finds particular application in promoting hydrocarbon conversions such as hydrocracking, isomerization, hydrofining (which includes denitrification and desulfurization) and reforming (which includes ring opening, isomerization and cracking).

The performance of a catalyst in a particular process depends upon the balance of the catalytic functions as well as the individual functional activities.

It is customary to accomplish dual catalytic functionality by supporting or otherwise incorporating a hydrogenative component in a solid refractory oxide support having acid activity. Thus, the support acts not only as a carrier for the hydrogenative component, but also as the acidic catalyst component. It is also customary to enhance the acidic properties of the support by addition of a halogen component.

To be effective the catalyst composite must not only possess a high degree of the desired catalytic activity and the proper balance of catalytic functions but must be able to retain activity and catalytic balance under processing conditions for sustained periods of time and must not be excessively sensitive to catalytic poisons.

In recent years attention has been directed to the catalytic properties of crystalline alumino-silicates, known generally as zeolites or molecular sieves. These materials have proved exceptionally suitable as acidic catalyst and as appropriate catalytic supports for dual functional catalysts.

A large number of synthetic crystalline zeolites have been prepared and are described in the patent and general literature. They are distinguished from each other on the basis of composition, crystal structure and adsorption properties. The existence of a number of zeolites having similar but distinguishable properties advantageously permits the selection of a particular number having optimum properties for a particular use. The exchange of and removal of metal in the crystal structure has proved an effective means of tailoring these materials to a specific functionality. Typical synthetic and natural alumino-silicates known in the art are well summarized in Dwyer et al., U.S. 3,254,034. A particular form of zeolite known as mordenite is described, inter alia, in Benesi, U.S. 3,190,939.

While superior catalysts based on zeolitic materials have been discovered and described in the patent literature, little work has been done on the enhancement of zeolitic acid activity by incorporation of acid activators such as halogens. The enhancement of acidity in the crystalline alumino-silicates is usually accomplished through changes in the crystalline structure or substitution of an integral metal cation for a hydrogen or acidic ion. With most zeolites the incorporation of halogen acid promoters is difficult owing to the fact that treatment of the zeolites with a strong acid collapses the crystalline structure, resulting in an amorphous material (see, for example, Rabo et al., U.S. 3,130,006). Mordenite is exceptional in this respect and seems better able to withstand strong acid treatment than zeolites of the class known as faujasites.

Thus, unlike amorphous refractory oxides which can be acid-activated by impregnation with halogen components from strong halogen acids, zeolites, particularly of the faujasite type, cannot be so treated.

Several means of enhancing the acidity of these catalysts have been proposed. Frilete et al., U.S. 3,033,778 describes the treatment of crystalline alumino-silicates with gaseous carbon dioxide. Mason et al., U.S. 3,137,656 describes the incorporation of an acid halide on crystalline alumino-silicates by treatment with an anhydrous halide, the resulting catalyst having enhanced activity but which must be used in a carefully controlled anhydrous atmosphere to prevent stripping off of the loosely held halide. Use in a wet atmosphere or treatment with an aqueous halide agent is disclosed as detrimental to catalyst activity.

The present invention is based on the discovery of a special preparative technique which results in a novel composition with intimate incorporation of fluoride into the crystalline structure of zeolites. The resulting fluoride-containing alumino-silicate possesses superior cracking activity and when composited with a hydrogenation component results in a highly active hydrocracking catalyst of exceptional process stability and selectivity.

SUMMARY OF THE INVENTION

It has been discovered that fluorine can be coordinated into the crystalline structure and interacted with the aluminum ions of the crystal lattice to give a novel catalytic material with highly acidic character. Incorporation of fluoride into the structure prevents its removal during use as a catalyst and provides an unusually good balance of catalytic functions for hydrocracking. Moreover, the fluoride addition can be accomplished without serious detrimental effect on the crystalline structure.

In broad aspect the invention is a method of incorporating fluorine into a zeolite crystalline alumino-silicate comprising the sequential treatment of a divalent alkaline earth metal form of crystalline alumino-silicate with (1) a sequestering agent, preferably ethylene diamine tetraacetic acid (EDTA), to complex out or loosen some of the crystalline trivalent aluminum ions followed by (2) treatment with an aqueous solution containing aluminum, fluoride and chloride ions, preferably an aqueous solution containing $AlF^{++}$ and $Cl^-$ ions, to replace the trivalent aluminum ions with $AlF^{++}$ ions in the lattice; (3) washing the material with deionized water to remove unincorporated ions; and finally (4) drying and calcining the composite.

The resulting catalyst is substantially reduced in sodium content, has fluorine incorporated into the crystalline structure and possesses exceptionally high catalytic activity and improved conversion selectivity for hydrocracking hydrocarbon oils, when composited with a hydrogenative metal component.

In one embodiment the catalyst is calcined at a temperature of at least 500° C. following treatment with an aqueous EDTA slurry and prior to treatment with the aqueous halide solution. The finished material is also calcined prior to use as a catalyst to remove water and decomposable ions such as ammonium.

It is essential that the zeolite be exchanged with divalent ions of the alkaline earth metal series, including Mg, Ca, Sr, and Ba, of which calcium is a preferred metal. It is customary to prepare zeolite from alkali metal salts and the resulting zeolite contains alkali metal cations which are believed to give the crystal structure its stability. It is well known that the alkali metal can be exchanged with divalent metal ion such as calcium. While the conversion of the alkali (usually sodium) form of the zeolite to the calcium form does not form a part of the present invention it is necessary that the divalent alkaline earth metal form be used as starting material for the method outlined above.

Crystalline alumino-silicates suitable for the invention include both natural and synthetic crystalline zeolites such as faujasites and mordenite.

The most suitable and preferred alumino-silicates are zeolites of the faujasite class and especially synthetic zeolitic faujasite known as Y-sieve. Y-faujasite is well known and its preparation described in U.S. 3,130,007, issued Apr. 21, 1964.

The following explanation of the chemistry of the fluoride incorporation according to the invention is included for greater elucidation of the invention and not as a limitation thereof.

Both the structure and acidity of zeolites arise from the structural equivalence of aluminum and silicon in the three-dimensional network. The network is built upon tetrahedra and the incorporation of aluminum requires its tetrahedral coordination. The tetrahedral coordination of the aluminum involves a charge separation between negatively charged aluminum and a cation, and this gives rise to the acidity of the structure. The incorporation of fluorine into the network affects both the structural role of the aluminum and the genesis of its acidity. The interaction of fluorine with an aluminum atom, by virtue of its much higher electron affinity relative to the shared oxygen atom, destroys the tetrahedral coordination of the aluminum and the charge separation associated with it. This is shown schematically in the following reaction:

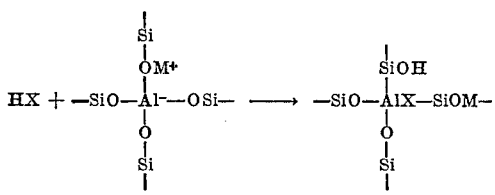

where X is initially chloride and then fluoride, as explained below. Aluminum so treated no longer contributes directly to the crystalline structure, and it no longer relies upon charge separation to provide acidity.

The aluminum is converted in two steps. First, the aluminum atoms are converted from $sp^3$ tetrahedral coordination to $sp^2$ trivalent octahedral coordination and then solubilized and removed completely from the structure by the action of a sequestering agent, e.g., polycarboxyalkylamino compounds such as ethylenediamine tetraacetic acid (EDTA). The exchange sites so vacated are then occupied by $AlF^{++}$ ions by the action of the aqueous halide solution. This incorporation of $AlF^{++}$ is enhanced by competitive exchange against $NH_4^+$ ions. At least partial removal of sodium from the crystalline structure is important. While this may be accomplished by acid treatment, there are disadvantages. Acid treatment of faujasites is, of course, detrimental to the structure and can, if severe treatment is employed, cause partial or complete collapse of the crystalline structure.

The technique of the present invention effectively removes sodium by exchange with divalent alkaline earth metals, especially calcium, and treatment with a sequestering agent which also serves to allow coordination of some of the aluminum ions as well as to remove calcium and residual sodium from the structure.

Sequestering agents are reagents that combine with metal ions to produce soluble complexes or chelate compounds with sufficient stability to be formed to an appreciable extent in solution. Kirk-Othmer, Encyclopedia of Chemical Technology, 2nd ed., vol. 6, page 2. An aqueous slurry of EDTA is the preferred sequestering agent, but any chelating agent which forms a soluble complex with the divalent alkaline earth metal and aluminum ions is suitable. A listing of several suitable water soluble organic chelating agents of the polycarboxyalkylamino type is given in U.S. Pat. No. 3,053,634.

Exchange of the alkali metal (sodium) for divalent alkaline earth metal to form the exchanged zeolite can be accomplished by various means; however, divalent alkaline earth metal chloride solution is a suitable and expedient exchange medium. The temperature of the exchange is not especially critical but higher temperatures in the range of 100° C. expedite the procedure and are preferred. As stated above, fairly severe exchange, i.e., reduction of sodium is important. It is preferred that sodium be reduced by exchange to at least 2% weight of the zeolite and preferably below 1% weight. Less severe exchange reduces the uptake of fluorine in subsequent steps.

Likewise, treatment with a sequentering agent can be effected over a wide range of conditions of concentration, contact time and temperature. The contacting conditions should be effective to remove substantially all of the divalent alkaline earth metal and sufficient trivalent aluminum ions from the structure to provide sites for the $AlF^{++}$ ions to be incorporated therein. The concentration of sequestering agent is variable depending on the reagent used. When EDTA is used an aqueous slurry is suitable. Contact time can vary from about 0.5 hour to several hours. The contact temperature can vary from about 50° C. to about 150° C. Additional time is required at the lower temperatures, and pressures above atmospheric are required at temperatures above the boiling point of the mixture. However, this treatment does affect both the surface area of and sodium removal from the catalyst and increased time of contact, while resulting in more complete sodium removal, tends to reduce surface area. Treatment at 100° C. for two hours has been found a suitable and effective treating condition.

After the zeolite is contacted with a sequestering agent it is then contacted with an aqueous halide reagent which contains aluminum, fluoride and chloride ions. The preferred halide reagent contains $AlF^{++}$ and $Cl^-$ ions. The solution preferably also contains decomposable cations such as ammonium ions in order that other soluble metal cations such as the alkali metals, which are catalyst poisons, are not incorporated into the zeolite. The relative ion concentration can vary from about 0.25 mole of fluoride per mole of $AlCl_3$ up to about one mole of fluoride per mole of $AlCl_3$. If the fluoride ion to $AlCl_3$ ratio is increased much above one, a precipitate of aluminum fluoride is formed.

Suitable fluoride compounds include, e.g., hydrogen fluoride, ammonium fluoride, ammonium bifluoride, tetramethylammonium fluoride, as well as other soluble fluoride compounds. The treatment with $AlF^{++}$ ionic reagent is suitably conducted at 100° C. for a period of about 2 hours. An aqueous mixture of aluminum chloride and ammonium fluoride is preferred; an equimolar mixture of ammonium fluoride and aluminum chloride has been found particularly satisfactory.

The time and temperature of the treatment is not a critical factor in the procedure; however, because of the highly acidic nature of the reagent prolonged high temperature treatment should be avoided. Generally, the contact temperature can vary from about 50° C. to about 150° C. and the contact time can vary from about 0.5 hour to several hours. The conditions are chosen so that from about 0.5% weight up to about 4% weight fluoride is incorporated into the structure. The preferred range is from about 1.5 to 2% weight fluoride.

The pH of the aqueous halide reagent should be in the range of about 2 to about 9. If hydrofluoric acid is used as a source of fluoride ions it is preferable to adjust the pH to this range with ammonium hydroxide so that the zeolite structure is not attacked by the acid.

In a preferred and especially important embodiment, the catalyst is subjected to an intermediate calcination during preparation. In this embodiment the catalyst is calcined at elevated temperature in the presence of air or inert gas following treatment with the acid complexing solution (EDTA) and prior to treatment with the ionic halogen solution. Temperature of the calcination should be about 500° C. and should not exceed about 900° C. Atmospheric pressure is suitable for the calcination treatment, pressure not being a variable of critical importance. (The calcination may be carried out in a flowing stream of gas or in a static atmosphere.) The time of calcining is not critical, but should be continued for sufficient time to remove water physically associated with the catalyst and to decompose any ammonia present—one hour should suffice but longer periods may be used. It is especially preferred that calcination be carried out for about 1–5 hours in still air at a temperature of about 600° C.

For many catalytic applications the novel fluorine-containing zeolitic material of the invention is preferably composited with a hydrogenative metal component such as metals of Group VI–B (Cr, Mo, W) and Group VIII of the Periodic Table and mixtures thereof. Noble metals of Group VIII (Pt and Pd) are especially suitable. The hydrogenative metals may be incorporated by various means known in the art. Palladium, for instance, is conveniently incorporated by impregnation with ammoniacal palladium chloride solution. When noble metals of Group VIII are used, it is preferred that the metal content be about 2% weight or less. Catalyst containing 0.25–1.0% weight palladium on zeolite treated according to the invention provides highly active and efficient hydrocracking catalysts.

Following incorporation of the metal hydrogenation component into the support, the catalyst is normally dried and calcined at a temperature of about 425° C. to 650° C. for one or two hours to form the finished catalyst. For many applications the metal may be converted to the sulfide form prior to use. Any method known in the art for sulfiding may be employed.

The catalysts are preferably used in the form of discrete particles, such as granules, extrudates, pellets and the like, usually ranging in size from about 1/16 inch to about 1/4 inch in average diameter. These pellets are preferably disposed in a stationary bed within a suitable reactor capable of withstanding high pressure. Of course, smaller catalyst particles may be used in fluidized or slurry reactor systems. The catalysts of the invention are suitable for hydroconversion process, and particularly suitable for hydrocracking.

In a hydrocracking process utilizing catalysts prepared according to the invention, suitable feeds include hydrocarbon distillates preferably boiling above the boiling range of gasoline, for example, boiling in the range of about 200° C. to 510° C. It is also generally desirable to reduce or remove catalyst poisons from the feed by a suitable pretreatment. Poisons such as organic nitrogen, sulfur and oxygen and coke precursor are effectively reduced by mild hydrogenation treatment with a suitable catalyst. Catalysts prepared according to the invention are suitable for such a mild hydrotreatment, the conditions being less severe than employed in hydrocracking. In general, for hydrocracking it is desirable to reduce feed organic nitrogen to below 100 p.p.m. by weight and perferably below 75 p.p.m. by weight.

Operating conditions appropriate for a hydrocracking process using the present catalyst include temperatures in the range of about 260° to about 450° C., hydrogen partial pressures of about 500 to about 2000 p.s.i., liquid hourly space velocities of about 0.2 to about 10, preferably 0.5 to 5, and hydrogen to oil ratios of about 5 to about 50.

In the hydrocracking process, feed is introduced to the reaction zone as a liquid, vapor or mixed liquid-vapor phase, depending upon the temperature, pressure and amount of hydrogen mixed with the feed and the boiling range of the feed stock utilized. The hydrocarbon feed, including fresh as well as recycle feed, is usually introduced into the reactioin zone with a large excess of hydrogen since the hydrocracking is accompanied by rather high consumption of hydrogen, usually of the order of 500 to 2000 standard cubic feet of hydrogen per barrel of feed converted. Conversion herein refers to the products obtained which boil below about 200° C. Excess hydrogen is generally recovered, at least in part, from the reaction zone effluent and recycled to the reactor together with additional makeup hydrogen. Pure hydrogen is not necessary since any suitable hydrogen-containing gas which is predominantly hydrogen can be used. For example, hydrogen-rich gas containing on the order of 70% or more hydrogen which is obtained from a catalytic reforming process can be used. (Gas may optionally contain nitrogen contaminants from a prior feed pretreating process, thus saving in process costs.)

Under normal conditions, total pressure employed in the hydrocracking zone will be in the range of from about 750 to 2500 p.s.i.g. For a given partial pressure of hydrogen in the reaction zone, total pressure will depend upon such factors as purity of the hydrogen gas, hydrogen/oil ratio and the like. Too low a partial pressure of hydrogen tends to decrease catalyst life.

EXAMPLE I

To demonstrate the inapplicability of conventional halide impregnation to crystalline alumino-silicates, a decationized synthetic faujasite (available as the acid or "H" form from the Linde Company) was treated with an aqueous solution of hydrogen fluoride containing 0.11 g. of HF. The faujasite was treated for one hour at room temperature, dried and calcined in air.

The treated catalyst contained about 0.85% fluoride; however, X-ray diffraction measurements showed the catalyst to have lost at least 50% of its crystalline structure. A more concentrated solution resulted in almost complete destruction of the crystalline structure.

Ammonium bifluoride impregnation of both decationized and calcium exchanged sieves produced similar results in about 0.85% fluoride incorporation and extensive loss of crystallinity.

Thus, conventional fluoride impregnation techniques, applicable to amorphous silica-alumina are clearly inappropriate for fluoride addition to crystalline alumino-silicate faujasites.

EXAMPLE II

A catalyst was prepared according to the invention by fluorine incorporation into a Na-faujasite obtained from the Linde Company under the trade designation of SK-40. The faujasite was successively treated with solutions of 1 M $CaCl_2$ for 16 hours at ambient temperature. Following each treatment the material was washed and filtered. This treatment was repeated four times to exchange most of the sodium for calcium.

Following calcium exchange the zeolite was treated with a slurry of ethylene diamine tetraacetic acid (EDTA). This treatment consisted of successively contacting the zeolite for 16 hours with 5% EDTA slurried with water at reflux temperature for 2 hours repeated four times. The treated material was then contacted with an $AlCl_2F$ reagent. The $AlCl_2F$ treatment was carried out by contacting the catalyst with 1 M $AlCl_2F$ (prepared by mixing equal molar amounts of $AlCl_3$ and $NH_4F$) which had been adjusted to a pH of 2 (with ammonium hydroxide) four times at reflux temperature. Palladium was incorporated by total impregnation from an ammoniacal solution in order to impart hydrogenation activity to the catalyst.

The final catalyst contained 0.5% weight F., 0.06% weight Na and 0.7% weight Pd, and had a surface area of 655 m.²/grams. This exceptionally high surface indicated that little or no loss of crystallinity occurred since collapse of crystal structure significantly reduces surface area.

A catalyst prepared in the same way as in Example II was tested for hydrocracking of a catalytically cracked heavy gas oil which had been pretreated to a nitrogen level of 0.5 p.p.m. nitrogen. Operating conditions were 4.0 LHSV (liquid feed volume per hour per volume of catalyst), a hydrogen to oil mol ratio of 10/1 and a temperature of 340° C. Conversion to hydrocarbons boiling below 196° C. was 60% weight. Since, in a practical hydrocracking process, the production of isomeric products is very important, the ratio of iso to normal components in the reaction products are useful parameters of catalyst selectivity. In addition, the production of light gaseous products is also a function of selectivity. A convenient measure being, for example, the molar ratio of $C_5/C_3$ product. The iso/normal ratio in this test was 3.4, 8.3, 11.4 for the $C_4$, $C_5$ and $C_6$ fractions, respectively, and the ratio of $C_5/C_3$ was 3.1.

EXAMPLE III

Catalyst were prepared in the same manner as described in Example II except that following the treatment with EDTA the catalysts were subjected to a calcination step at various temperatures.

The catalysts, as in the previous examples, were dried and again calcined at 550° C. prior to incorporation of the palladium component.

The table shows the effect of the intermediate calcination temperature (after the EDTA) treatment.

TABLE

| Intermediate calcination temperature, ° C.: | Relative activity [1] |
| --- | --- |
| None | 1 |
| 500 | 1.7 |
| 550 | 2.2 |
| 600 | 3.3 |

[1] Relative space velocity for 50% conversion of n-decane at 250° C., 1200 p.s.i., 30 hydrogen to oil ratio.

An increase in the intermediate temperature has a marked effect on catalytic activity.

I claim as my invention:

1. A method of preparing a catalytically active crystalline alumino-silicate containing fluoride incorporated into the crystalline structure comprising the sequential steps of (a) ion exchanging a crystalline alumino-silicate zeolite with a divalent alkaline earth metal selected from the group consisting of magnesium, calcium, strontium and barium; (b) contacting the exchanged zeolite with a sequestering agent under conditions effective to remove substantially all of the divalent alkaline earth metal and trivalent aluminum ions; (c) contacting the zeolite with an aqueous halide solution containing aluminum, fluoride and chloride ions, the relative ion concentrations and contacting conditions being effective to replace the removed trivalent aluminum ions with $AlF^{+2}$ ions; and (d) washing the thus contacted zeolite to remove unincorporated ions, followed by drying and calcining the composite.

2. The method of claim 1 wherein the divalent alkaline earth metal is calcium and the sequestering agent is an aqueous slurry of ethylenediamine tetraacetic acid.

3. The method of claim 1 wherein the alumino-silicate is calcined at a temperature between about 500° C. to about 900° C. following the contact with sequestering agent and prior to treatment with the halide solution.

4. The method of claim 3 wherein the calcination is carried out with air at a temperature of about 600° C. for a period of about 1 to 5 hours, the sequestering agent is ethylenediamine tetraacetic acid and the halide solution contains $AlF^{+2}$ and $Cl^-$ ions.

5. The method of claim 1 wherein the fluoride containing alumino-silicate is composited with a hydrogenative metal component selected from the group consisting of Group VI-B, Group VIII of the Periodic Table and mixtures thereof.

6. The method of claim 5 wherein the hydrogenative metal component is between 0.25–1.0% weight palladium.

7. The method of claim 1 wherein the halide solution comprises equimolar amounts of aluminum chloride and ammonium fluoride and wherein contacting with the sequestering agent and aqueous halide solution is effected at about 100° C. for about 2 hours.

8. A composition comprising a crystalline alumino-silicate zeolite having fluoride incorporated into the crystalline structure and having an alkali metal content of less than about 2% weight, the composition being prepared by the sequential steps of (a) ion exchanging the zeolite with a divalent alkaline earth metal selected from the group consisting of magnesium, calcium, strontium and barium; (b) contacting the exchanged zeolite with a sequestering agent under conditions effective to remove substantially all of the divalent alkaline earth metal and trivalent aluminum ions; (c) contacting the zeolite with an aqueous halide solution containing aluminum, fluoride and chloride ions, the relative ion concentration and contacting conditions being effective to replace the removed trivalent aluminum ions with $AlF^{+2}$ ions; and (d) washing the contacted zeolite to remove unincorporated ions, followed by drying and calcining the composite.

9. The composition of claim 8 wherein the zeolite is calcined in air at a temperature between about 500° C. and 900° C. after treatment with the sequesteirng agent and prior to treatment with the aqueous halide solution.

10. The composition of claim 7 wherein the fluoride containing alumino-silicate is composited with a hydrogenative metal component selected from the group consisting of Group VI-B, Group VIII of the Periodic Table and mixtures thereof.

11. The composition of claim 10 wherein the hydrogenative metal component is between 0.25 to 1.0% weight palladium.

References Cited

UNITED STATES PATENTS

| | | | |
|---|---|---|---|
| 3,442,795 | 5/1969 | Kerr et al. | 208—120 |
| 3,455,842 | 7/1969 | Cornelius et al. | 252—455 Z |
| 3,477,964 | 11/1969 | Fishel | 252—442 |
| 3,480,539 | 11/1969 | Voorhies, Jr., et al. | 208—111 |
| 3,594,331 | 7/1971 | Elliott, Jr. | 252—442 |

CARL F. DEES, Primary Examiner

U.S. Cl. X.R.

252—455 Z